(12) United States Patent
Inagaki et al.

(10) Patent No.: US 8,436,097 B2
(45) Date of Patent: May 7, 2013

(54) PROCESS FOR PRODUCING MODIFIED POLYMER RUBBER

(75) Inventors: Katsunari Inagaki, Ichihara (JP); Seiichi Mabe, Niihama (JP); Mayumi Oshima, Bartlesville, OK (US)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/608,550

(22) Filed: Oct. 29, 2009

(65) Prior Publication Data

US 2010/0048806 A1 Feb. 25, 2010

Related U.S. Application Data

(62) Division of application No. 11/110,012, filed on Apr. 20, 2005, now Pat. No. 7,625,981.

(30) Foreign Application Priority Data

Jun. 4, 2004 (JP) .................................. 2004-166716
Sep. 15, 2004 (JP) .................................. 2004-268012

(51) Int. Cl.
*C08F 8/00* (2006.01)
*C08F 8/42* (2006.01)

(52) U.S. Cl.
USPC ........... 525/192; 525/102; 525/245; 525/254; 525/274; 525/288; 525/342; 526/180

(58) Field of Classification Search .................. 525/342, 525/102, 192, 245, 254, 274, 288; 526/180
See application file for complete search history.

(56) References Cited

U.S. PATENT DOCUMENTS

| | | | |
|---|---|---|---|
| 4,379,891 A | 4/1983 | Haynes | |
| 5,189,109 A | 2/1993 | Imai et al. | |
| 5,219,938 A | 6/1993 | Imai et al. | |
| 5,527,753 A * | 6/1996 | Engel et al. | .................... 502/155 |
| 5,610,259 A | 3/1997 | Cella et al. | |
| 6,008,295 A | 12/1999 | Takeichi et al. | |
| 6,228,908 B1 | 5/2001 | Takeichi et al. | |
| 6,518,350 B1 | 2/2003 | Kobayashi et al. | |
| 6,992,147 B1 | 1/2006 | Ozawa et al. | |
| 2002/0077429 A1 | 6/2002 | Inagaki et al. | |
| 2005/0159554 A1 | 7/2005 | Endou et al. | |

FOREIGN PATENT DOCUMENTS

| | | |
|---|---|---|
| CA | 1185393 A1 | 4/1985 |
| EP | 0 341 496 A2 | 11/1989 |
| EP | 1 113 024 A1 | 7/2001 |
| JP | 57212205 A | 12/1982 |
| JP | 60-072907 A | 4/1985 |
| JP | 11228647 A | 8/1999 |
| JP | 2003514078 T | 4/2003 |
| WO | 0134658 A1 | 5/2001 |
| WO | WO 03 087181 | * 10/2003 |

OTHER PUBLICATIONS

Silquest Silanes and Typical Uses, Crompton, 2002.*
JP Office Action issued Oct. 13, 2009 in counterpart JP Application No. 2004-166716 (English translation attached).

* cited by examiner

*Primary Examiner* — Ling Choi
*Assistant Examiner* — Gennadiy Mesh
(74) *Attorney, Agent, or Firm* — Panitch Schwarze Belisario & Nadel LLP

(57) ABSTRACT

A process for producing a modified polymer rubber comprising the steps of:
  (1) polymerizing a conjugated diene monomer or a combination thereof with an aromatic vinyl monomer in a hydrocarbon solvent, in the presence of an alkali metal catalyst or a specified alkali metal compound, to form an alkali metal end-carrying active polymer, and
  (2) reacting the alkali metal end-carrying active polymer with a specified isocyanurate compound or a combination thereof with a specified coupling agent in a hydrocarbon solvent.

8 Claims, No Drawings

PROCESS FOR PRODUCING MODIFIED POLYMER RUBBER

CROSS-REFERENCE TO RELATED APPLICATIONS

This application is a division of U.S. patent application Ser. No. 11/110,012, filed Apr. 20, 2005, the disclosure of which is hereby incorporated herein by reference in its entirety.

BACKGROUND OF THE INVENTION

The present invention relates to a process for producing a modified polymer rubber having excellent impact resilience. A modified polymer rubber produced according to said process is very suitable for producing a motorcar tire having superior fuel cost saving.

A styrene-butadiene copolymer produced by an emulsion polymerization method has been known as a rubber used for making a motorcar tire. However, said copolymer has a problem that a motorcar tire comprising said copolymer is not satisfactory from a viewpoint of fuel cost saving, because the copolymer does not have sufficient impact resilience.

In order to produce a rubber having superior impact resilience, JP 60-72907 A discloses a production process, which comprises the step of copolymerizing butadiene and styrene in a hydrocarbon solvent using an organolithium compound as an initiator, and a Lewis base such as an ether as a microstructure-controlling agent.

Also, U.S. Pat. No. 5,189,109A discloses a process for producing a modified polymer rubber having improved impact resilience, the process comprising the step of reacting an alkali metal linked to the end of a diene polymer rubber with a specific acrylamide.

A styrene-butadiene copolymer produced by an emulsion polymerization method has been known as a rubber used for making a motorcar tire. However, said copolymer has a problem that a motorcar tire comprising said copolymer is not satisfactory from a viewpoint of fuel cost saving, because the copolymer does not have sufficient impact resilience.

In order to produce a rubber having superior impact resilience, JP 60-72907 A discloses a production process, which comprises the step of copolymerizing butadiene and styrene in a hydrocarbon solvent using an organolithium compound as an initiator, and a Lewis base such as an ether as a microstructure-controlling agent.

Also, U.S. Pat. No. 5,189,109A discloses a process for producing a modified polymer rubber having improved impact resilience, the process comprising the step of reacting an alkali metal linked to the end of a diene polymer rubber with a specific acrylamide.

In recent years, however, a level demanded for fuel cost saving of a motorcar tire has become much higher from an environmental point of view, and therefore, any of the above-mentioned polymer rubbers cannot satisfy such a demand sufficiently.

BRIEF SUMMARY OF THE INVENTION

An object of the present invention is to provide a process for producing a modified polymer rubber having excellent impact resilience.

The present invention is a process for producing a modified polymer rubber comprising the steps of:

(1) polymerizing a conjugated diene monomer or a combination thereof with an aromatic vinyl monomer in a hydrocarbon solvent, in the presence of an alkali metal catalyst, to form an alkali metal end-carrying active polymer, and (2) reacting the alkali metal end-carrying active polymer with a coupling agent represented by the following formula [1] and an isocyanurate compound represented by the following formula [2] in a hydrocarbon solvent, or reacting the alkali metal end-carrying active polymer with the isocyanurate compound in a hydrocarbon solvent:

$$R_cMX_d \qquad [1]$$

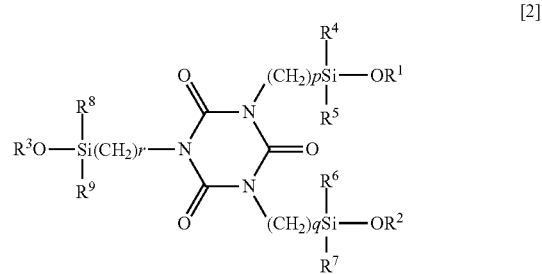

[2]

wherein R in the formula [1] is an alkyl group, an alkenyl group, a cycloalkenyl group or an aromatic hydrocarbon group; M therein is a silicon atom or a tin atom; X therein is a halogen atom; c therein is an integer of 0 to 2; d therein is an integer of 2 to 4; each of $R^1$ to $R^3$ in the formula [2] is independently of one another an alkyl group having 1 to 8 carbon atoms; each of $R^4$ to $R^9$ therein is independently of one another an alkoxy group having 1 to 8 carbon atoms or an alkyl group having 1 to 8 carbon atoms; and each of p, q and r therein is independently of one another an integer of 1 to 8. This process is hereinafter referred to as "process-1".

Also, the present invention is a process for producing a modified polymer rubber comprising the steps of:

(1) polymerizing a conjugated diene monomer or a combination thereof with an aromatic vinyl monomer in a hydrocarbon solvent, in the presence of a compound represented by the following formula [3], to form an alkali metal end-carrying active polymer, and (2) reacting the alkali metal end-carrying active polymer with an isocyanurate compound represented by the above-mentioned formula [2] in a hydrocarbon solvent:

$$E(CH_2)_nT_mJ \qquad [3]$$

wherein E is a group which contains a nitrogen atom having a substituent; T is a conjugated diene monomer unit or an aromatic vinyl monomer unit; m is an integer of 0 to 10, and preferably 0 to 5; n is an integer of 1 to 10, and preferably 3 to 10; and J is an alkali metal. This process is hereinafter referred to as "process-2".

Further, the present invention is a rubber composition comprising the following components (1) to (5):

(1) 10 to 100 parts by weight of a modified polymer rubber produced by the above-mentioned process-1 or process-2,
(2) 0 to 90 parts by weight of other rubber,
(3) 0 to 100 parts by weight of carbon black,
(4) 5 to 150 parts by weight of silica, and
(5) 2 to 20% by weight of a silane coupling agent, wherein a combined amount of the component (1) with the component (2) is 100 parts by weight; and an amount of the component (5) is based on an amount of the component (4), namely, an amount of the component (4) is 100% by weight.

The above-mentioned "alkali metal end-carrying active polymer" mentioned in each of the processes-1 and 2 is hereinafter referred to collectively as an "active polymer". In the present invention, the above-mentioned "monomer unit" such as the "conjugated diene monomer unit" and "aromatic vinyl monomer unit" means a polymerized monomer unit.

DETAILED DESCRIPTION OF THE INVENTION

Examples of the conjugated diene monomer in the present invention are 1,3-butadiene, isoprene, 1,3-pentadiene (piperylene), 2,3-dimethyl-1,3-butadiene and 1,3-hexadiene. Among them, 1,3-butadiene or isoprene is preferable from a viewpoint of availability thereof and physical properties of a modified polymer rubber produced.

Examples of the aromatic vinyl monomer in the present invention are styrene, α-methylstyrene, vinyltoluene, vinylnaphthalene, divinylbenzene, trivinylbenzene and divinylnaphthalene. Among them, styrene is preferable from a viewpoint of availability thereof and physical properties of a modified polymer rubber produced.

The hydrocarbon solvent in the present invention is a solvent, which does not deactivate both the alkali metal catalyst in the step (1) of the process-1 and the compound represented by the formula [3] in the step (1) of the process-2. Suitable examples thereof are an aliphatic hydrocarbon, an aromatic hydrocarbon and an alicyclic hydrocarbon. Particularly preferable examples thereof are those having 3 to 12 carbon atoms. Specific examples thereof are propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene; and a combination of two or more thereof.

The alkali metal catalyst in the process-1 may be that known in the art. Examples of the alkali metal catalyst are a metal such as lithium, sodium, potassium, rubidium and cesium; a hydrocarbon compound having a chemical bond with said metal; and a complex compound of said metal with a polar compound. Among them, preferred is a lithium-containing or sodium-containing compound having 2 to 20 carbon atoms, and examples thereof are ethyllithium, n-propyllithium, iso-propyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, 4-cyclopentyllithium, 1,4-dilithio-butene-2, sodium naphthalene, sodium biphenyl, a potassium-tetrahydrofuran complex, a potassium-diethoxyethane complex, and a sodium salt of an α-methylstyrene tetramer.

The coupling agent represented by the formula [1] may be that known in the art. Examples of the coupling agent, wherein M in the formula [1] is a silicon atom, are silicon tetrachloride, silicon tetrabromide, methyltrichlorosilane, butyltrichlorosilane, dichlorosilane, and bistrichlorosilylsilane. Examples of the coupling agent, wherein M in the formula [1] is a tin atom, are tin tetrachloride, tin tetrabromide, methyltrichlorotin, butyltrichlorotin, dichlorotin, and bistrichlorosilyltin.

The coupling agent is used in an amount of 0.01 to 0.4 mol in terms of an amount of a halogen atom contained therein, per 1 mol of an active polymer in the step (2) of the process-1.

Each of $R^1$ to $R^3$ in the formula [2] is preferably independently of one another a methyl group, an ethyl group, a propyl group or a butyl group; each of $R^4$ to $R^9$ therein is preferably independently of one another a methoxy group, an ethoxy group, a propoxy group or a butoxy group; and each of p, q and r therein is preferably independently of one another an integer of 2 to 5.

A compound represented by the formula [2] may be that known in the art. Examples thereof are 1,3,5-tris(3-trimethoxysilylpropyl) isocyanurate, 1,3,5-tris(3-triethoxysilylpropyl) isocyanurate, 1,3,5-tris(3-tripropoxysilylpropyl) isocyanurate and 1,3,5-tris(3-tributoxysilylpropyl) isocyanurate. Among them, particularly preferred is 1,3,5-tris(3-trimethoxysilylpropyl) isocyanurate, from a viewpoint of production of a modified polymer rubber having a remarkably improved fuel cost saving.

E in the formula [3] is preferably an N,N-dimethylamino group, an N,N-diethylamino group, an N,N-dipropylamino group, an N,N-dibutylamino group, a morpholino group or an imidazolyl group.

From a viewpoint of excellent solubility in a hydrocarbon solvent of the compound represented by the formula [3], T is particularly preferably an isoprene monomer unit, and m is particularly preferably 2; namely, Tm is particularly preferably two isoprene monomer units.

Examples of an alkali metal of J in the formula [3] are lithium, sodium, potassium and cesium. Among them, preferred is lithium, because such a compound represented by the formula [3] has high solubility in a hydrocarbon solvent.

A compound represented by the formula [3] may be that known in the art. Examples thereof are 3-(N,N-dimethylamino)-1-propyllithium, 3-(N,N-diethylamino)-1-propyllithium, 3-(N,N-dipropylamino)-1-propyllithium, 3-(N,N-dibutylamino)-1-propyllithium, 3-morpholino-1-propyllithium and 3-imidazolyl-1-propyllithium; and a compound containing 1 to 10 butadiene monomer units, 1 to 10 isoprene monomer units, or 1 to 10 styrene monomer units between "propyl" and "lithium" of each of the above-mentioned compounds, namely, a compound (1) having T in the formula [3] of a butadiene monomer unit, an isoprene monomer unit, or a styrene monomer unit, and (2) having m therein of an integer of 1 to 10. Among them, preferred is 3-(N,N-dimethylamino)-1-propyllithium, or a compound containing 2 isoprene monomer units between "propyl" and "lithium" of said compound, in order to (1) form an active polymer having a narrow molecular weight distribution at a rapid reaction rate, and (2) produce a modified polymer rubber having a remarkably improved fuel cost saving; and from an industrial point of view, further preferred is a compound containing 2 isoprene monomer units between "propyl" and "lithium" of 3-(N,N-dimethylamino)-1-propyllithium, which has excellent solubility in a hydrocarbon solvent.

When a combination of a conjugated diene monomer with an aromatic vinyl monomer is used in the step (1) of each of the processes-1 and 2, a ratio by weight of the former monomer to the latter monomer (namely, conjugated diene monomer/aromatic vinyl monomer) is preferably 50/50 to 90/10, and further preferably 55/45 to 85/15. When said ratio is smaller than 50/50, an active polymer formed in the step (1) is insoluble in a hydrocarbon solvent, and as a result, homogeneous polymerization may be impossible in the step (1). When said ratio is larger than 90/10, the produced modified polymer rubber may be low in its strength.

A polymerization condition such as a polymerization time and a polymerization temperature in the step (1) of each of the processes-1 and 2 may be that known in the art, for example, JP 60-72907 A. There may be used in the step (1), for example, (i) a compound improving random-polymerizability, or (ii) an additive regulating an amount of a vinyl group contained in an active polymer, which vinyl group is derived from a conjugated diene monomer.

An example of the above-mentioned additive used for regulating an amount of a vinyl group is a Lewis basic compound. Said compound is preferably an ether or a tertiary amine in view of industrial availability.

Examples of the above-mentioned ether are a cyclic ether such as tetrahydrofuran, tetrahydropyran and 1,4-dioxane; an aliphatic mono ether such as diethyl ether and dibutyl ether; an aliphatic diether such as ethylene glycol dimethyl ether, ethylene glycol diethyl ether, ethylene glycol dibutyl ether, diethylene glycol diethyl ether and diethylene glycol dibutyl ether; and an aromatic ether such as diphenyl ether and anisole.

Examples of the above-mentioned tertiary amine are triethylamine, tripropylamine, tributylamine, N,N,N',N'-tetramethylethylenediamine, N,N-diethylaniline, pyridine and quinoline.

In the step (2) of each of the processes-1 and 2, the compound represented by the formula [2] is used in an amount of usually 0.06 to 10 mol, preferably 0.1 to 5 mol, and further preferably 0.2 to 2 mol, per 1 mol of the active polymer. When said amount is smaller than 0.06 mol, an improving effect on fuel cost saving of the modified polymer rubber is small. When said amount is larger than 10 mol, the compound represented by the formula [2] remains unreacted in a solvent, which is not preferable from an economical point of view, because an additional step of separating said compound from the solvent is required in order to recycle and reuse the solvent.

The reaction in the step (2) of each of the processes-1 and 2 proceeds rapidly. A preferable example of an embodiment of the step (2) is a method comprising the step of adding the compound represented by the formula [2] to the reaction mixture formed in the step (1). A reaction temperature in the step (2) is generally a room temperature to 100° C., and a reaction time therein is generally a few seconds to a few hours.

When an isocyanurate compound is used in combination with a coupling agent in the step (2) of the process-1, the isocyanurate compound and the coupling agent are not particularly limited in their addition order, and they are added at the same time or separately. A preferable embodiment thereof is a method comprising the steps of (i) adding a coupling agent to make a reaction, and then, (ii) further adding an isocyanurate compound to make a further reaction.

From a viewpoint of kneadability of a modified polymer rubber, the above-mentioned coupling agent used in the step (2) of the process-1 may be added after the step (1) of the process-2 in order to react the coupling agent with an active polymer formed in the step (1). The coupling agent is added in an amount of generally 0.005 to 0.4 mol, and preferably 0.01 to 0.3 mol per one mol of the active polymer. When said amount is smaller than 0.005 mol, an improving effect on kneadability of the modified polymer rubber is small. When said amount is larger than 0.4 mol, a proportion of the active polymer reacting with the compound represented by the formula [2] decreases, so that an improving effect on fuel cost saving of the modified polymer rubber may be low, or a viscosity of a reaction mixture formed by a reaction with the coupling agent may be very high.

A modified polymer rubber contained in a reaction mixture produced in the step (2) of each of the processes-1 and 2 is solidified according to a solidifying method usually carried out for producing a rubber by a solution polymerization method, such as (1) a method comprising the step of adding a coagulant, and (2) a method comprising the step of adding steam. A solidifying temperature is not particularly limited. The solidified modified polymer rubber is separated, and then dried with a drier known in the art such as a band drier and an extrusion-type drier, which are commonly used in a synthetic rubber production. A drying temperature is not particularly limited.

A Mooney viscosity ($ML_{1+4}$ 100° C.) of a modified polymer rubber is preferably 10 to 200, and further preferably 20 to 150. When said viscosity is lower than 10, mechanical properties such as tensile strength of its vulcanized rubber thereof may be low. When said viscosity is higher than 200, its miscibility with other rubber may be so poor in case of blending said modified polymer rubber with said other rubber in order to make a rubber composition, that it is difficult to process the modified polymer rubber, and as a result, mechanical properties of its vulcanized rubber composition may be low.

An amount of a vinyl group contained in a modified polymer rubber (which vinyl bond is derived from a conjugated diene monomer), namely, an amount of a polymerization unit formed by 1,2-polymerization of the conjugated diene monomer, is preferably 10 to 70%, and further preferably 15 to 60%, wherein all of the conjugated diene monomer units is 100%, namely, a total amount of (i) polymerization units formed by 1,2-polymerization of the conjugated diene monomer, and (ii) polymerization units formed by 1,4-polymerization thereof is 100%. When said content is smaller less than 10%, a glass transition temperature of the modified polymer rubber may be too low, and as a result, a grip performance of a motorcar tire comprising the modified polymer rubber may be deteriorated. When said content is larger than 70%, a glass transition temperature of the modified polymer rubber may be too high, and as a result, an impact resilience of the modified polymer rubber may be deteriorated.

A modified polymer rubber produced according to each of the processes-1 and 2 may be used in combination with a component such as other rubbers and additives. Examples of said other rubber are a styrene-butadiene copolymer rubber produced by an emulsion polymerization method; a polybutadiene rubber, a butadiene-isoprene copolymer rubber and a styrene-butadiene copolymer rubber produced by a solution polymerization method using a catalyst such as an anion polymerization catalyst and a Ziegler type catalyst; and a natural rubber; and a combination of two or more thereof.

An amount of a modified polymer rubber contained in a rubber composition comprising said modified polymer rubber and the above-mentioned other rubber is preferably 10 to 100 parts by weight, and more preferably 20 to 100 parts by weight, wherein a total amount of said modified polymer rubber and other rubber is 100 parts by weight. When said amount is smaller than 10% by weight, an impact resilience of said rubber composition may hardly be improved, and also, its processability is not good.

Examples of the above-mentioned additives used in combination with the modified polymer rubber are those usually employed in a rubber industry, for example, a vulcanizing agent such as sulfur; stearic acid; zinc white; a vulcanization accelerator such as a thiazol-type vulcanization accelerator, a thiuram-type vulcanization accelerator, and a sulfonamide-type vulcanization accelerators; an organic peroxide; a reinforcing agent such as carbon black (for example, HAF-grade carbon black, and ISAF-grade carbon black); a filler such as silica, calcium carbonate and talc; a silane coupling agent; an extender oil; a processing coagent; and an antioxidant. A kind and an amount of each of the above-mentioned additives may be determined depending upon purposes in using said rubber composition.

An amount of carbon black contained in the above-mentioned rubber composition is usually 0 to 100 parts by weight, wherein a total amount of the modified polymer rubber and other rubber is 100 parts by weight; an amount of silica contained therein is usually 5 to 150 parts by weight, wherein a total amount of the modified polymer rubber and other rubber is 100 parts by weight; and an amount of a silane coupling agent contained therein is usually 2 to 20% by weight, wherein an amount of silica is 100% by weight.

A process for producing the above-mentioned rubber composition is not limited. An example thereof is a process comprising the step of mixing respective components in a mixer known in the art such as a roll and a Banbury mixer. The so-produced rubber composition is usually vulcanized, and then, is used as a vulcanized rubber composition.

Since the modified polymer rubber produced according to each of the processes-1 and 2 is excellent in its impact resilience and processability, a rubber composition comprising said modified polymer rubber is most suitable for a motorcar tire having excellent fuel cost saving. Said rubber composition can also be employed for uses such as soles for shoes, floor materials and rubber vibration insulators.

EXAMPLES

The present invention is explained with reference to the following Examples, which do not limit the scope of the present invention. The following Examples 1 to 3 and Comparative Examples 1 and 2 relate to the process-1, and the following Examples 4 and 5 and Comparative Examples 3 and 4 relate to the process-2.

Example 1

A 20 liter-inner volume stainless steel polymerization reactor was washed, dried, and then purged with dry nitrogen. To the reactor, 1405 g of 1,3-butadiene, 395 g of styrene, 328 g of tetrahydrofuran, 10.2 kg of hexane and 12.8 mmol of n-butyllithium (n-hexane solution) were added. Polymerization was carried out at 65° C. for 3 hours under stirring, thereby obtaining a polymerization mixture.

To the polymerization mixture, 1.70 g (2.76 mmol) of 1,3,5-tris(3-trimethoxysilylpropyl)isocyanurate was added, and the obtained mixture was reacted at 65° C. for 30 minutes under stirring.

To the obtained reaction mixture, 10 ml of methanol was added, and the obtained mixture was further stirred at 65° C. for 5 minutes, thereby obtaining a reaction mixture. The reaction mixture was taken out, and was mixed with 10 g of 2,6-di-t-butyl-p-cresol, SUMILIZER BHT, manufactured by Sumitomo Chemical Co., Ltd. Thereafter, most of hexane was evaporated, and successively the remainder was dried under a reduced pressure at 55° C. for 12 hours, thereby obtaining a modified polymer rubber.

Example 2

Example 1 was repeated to obtain a modified polymer rubber, except that (i) an amount of n-butyllithium (n-hexane solution) was changed to 11.3 mmol, (ii) 0.039 g (0.23 mmol) of silicon tetrachloride as a coupling agent was added after completion of the polymerization, and (iii) 2.70 g (4.39 mmol) of 1,3,5-tris(3-trimethoxysilylpropyl)isocyanurate was added after a lapse of 15 minutes from the addition of silicon tetrachloride.

Example 3

Example 1 was repeated to obtain a modified polymer rubber, except that (i) an amount of n-butyllithium (n-hexane solution) was changed to 12.0 mmol, (ii) 0.041 g (0.24 mmol) of silicon tetrachloride was added after completion of the polymerization, and (iii) 1.43 g (2.33 mmol) of 1,3,5-tris(3-trimethoxysilylpropyl)isocyanurate was added after a lapse of 15 minutes from the addition of silicon tetrachloride.

Comparative Example 1

Example 1 was repeated to obtain a polymer rubber, except that (i) an amount of n-butyllithium (n-hexane solution) was changed to 8.5 mmol, (ii) 0.027 g (0.16 mmol) of silicon tetrachloride was added after completion of the polymerization, and (iii) 1,3,5-tris(3-trimethoxysilylpropyl)isocyanurate added after a lapse of 15 minutes from the addition of silicon tetrachloride was changed to 1.26 g (7.65 mmol) of N,N-dimethylaminopropylacrylamide.

Comparative Example 2

Example 1 was repeated to obtain a polymer rubber, except that (i) an amount of n-butyllithium (n-hexane solution) was changed to 8.7 mmol, (ii) 0.030 g (0.174 mmol) of silicon tetrachloride was added after completion of the polymerization, and (iii) 1,3,5-tris(3-trimethoxysilylpropyl)isocyanurate was not added.

Example 4

A 20 liter-inner volume stainless steel polymerization reactor was washed, dried, and then purged with dry nitrogen. To the reactor, a cyclohexane solution containing 18.6 mmol of an active compound, which has two isoprene monomer units between "propyl" and "lithium" of 3-(N,N-dimethylamino)-1-propyllithium, said solution (trademark: AI200 CE) being manufactured by FMC Lithium Co., Ltd., 1405 g of 1,3-butadiene, 395 g of styrene, 328 g of tetrahydrofuran, and 10.2 kg of hexane were added. Polymerization was carried out at 65° C. for 3 hours under stirring, thereby obtaining a polymerization mixture.

To the polymerization mixture, 0.063 g (0.372 mmol) of silicon tetrachloride as a coupling agent was added, and the obtained mixture was reacted at 65° C. for 30 minutes under stirring.

To the obtained reaction mixture, 4.55 g (7.32 mmol) of 1,3,5-tris(3-trimethoxysilylpropyl)isocyanurate was added, and the obtained mixture was further stirred at 65° C. for 5 minutes, thereby obtaining a reaction mixture.

To the obtained reaction mixture, 10 ml of methanol was added, and the obtained mixture was further stirred at 65° C. for 5 minutes, thereby obtaining a reaction mixture.

The reaction mixture was taken out, and was mixed with 10 g of 2,6-di-t-butyl-p-cresol, SUMILIZER BHT, manufactured by Sumitomo Chemical Co., Ltd. Thereafter, most of hexane was evaporated, and successively the remainder was dried under a reduced pressure at 55° C. for 12 hours, thereby obtaining a modified polymer rubber.

Example 5

Example 4 was repeated to obtain a modified polymer rubber, except that (i) an amount of AI200 CE was changed to 22.5 mmol (cyclohexane solution), (ii) an amount of silicon tetrachloride was changed to 0.076 g (0.45 mmol), and (iii) an amount of 1,3,5-tris(3-trimethoxysilylpropyl)isocyanurate was changed to 2.75 g (4.47 mmol).

Comparative Example 3

Example 4 was repeated to obtain a polymer rubber, except that (i) an amount of AI200 CE was changed to 10.3 mmol (cyclohexane solution), (ii) an amount of silicon tetrachloride was changed to 0.036 g (0.21 mmol), and (iii) 1,3,5-tris(3-trimethoxysilylpropyl)isocyanurate was changed to 1.53 g (9.27 mmol) of N,N-dimethylaminopropylacrylamide.

Comparative Example 4

Example 4 was repeated to obtain a polymer rubber, except that (i) AI200 CE was changed to 8.7 mmol of n-butyllithium (n-hexane solution), (ii) an amount of silicon tetrachloride was changed to 0.030 g (0.174 mmol), and (iii) 1,3,5-tris(3-trimethoxysilylpropyl)isocyanurate was not added.

The above Examples 1 to 3 and Comparative Examples 1 and 2 are shown in Table 1, and the above Examples 4 and 5 and Comparative Examples 3 and 4 are shown in Table 2.

TABLE 1

|  | Example | | | Comparative Example | |
|---|---|---|---|---|---|
|  | 1 | 2 | 3 | 1 | 2 |
| Starting material |  |  |  |  |  |
| Coupling agent | — | $SiCl_4$ | $SiCl_4$ | $SiCl_4$ | $SiCl_4$ |
| Isocyanurate compound |  |  |  |  |  |
| Kind (note-1) | I | I | I | — | — |
| Amount used (mmol) | 2.76 | 4.39 | 2.33 | — | — |
| non-Isocyanurate compound |  |  |  |  |  |
| Kind (note-2) | — | — | — | II | — |
| Amount used (mmol) | — | — | — | 7.65 | — |
| Modified polymer rubber |  |  |  |  |  |
| Styrene unit content (% by weight) | 23 | 23 | 23 | 23 | 23 |
| Vinyl group content (%) | 60 | 60 | 60 | 60 | 60 |
| Mooney viscosity ($ML_{1+4}$ 100° C.) | 68 | 73 | 69 | 67 | 66 |
| Impact resilience (@60° C., %) | 62 | 60 | 60 | 54 | 52 |

(note-1)
I: 1,3,5-tris(3-trimethoxysilylpropyl) isocyanurate.
(note-2)
II: N,N-dimethylaminopropylacrylamide.

TABLE 2

|  | Example | | Comparative Example | |
|---|---|---|---|---|
|  | 4 | 5 | 3 | 4 |
| Starting material |  |  |  |  |
| $E(CH_2)_nT_mJ$ (note-3) | III | III | III | — |
| Coupling agent | SiCl4 | $SiCl_4$ | $SiCl_4$ | $SiCl_4$ |
| Isocyanurate compound |  |  |  |  |
| Kind (note-4) | I | I | — | — |
| Amount used (mmol) | 7.32 | 4.47 | — | — |
| non-Isocyanurate compound |  |  |  |  |
| Kind (note-5) | — | — | II | — |
| Amount used (mmol) | — | — | 9.27 | — |
| Modified polymer rubber |  |  |  |  |
| Styrene unit content (% by weight) | 23 | 23 | 23 | 23 |
| Vinyl group content (%) | 60 | 58 | 60 | 60 |
| Mooney viscosity($ML_{1+4}$ 100° C.) | 72 | 66 | 77 | 66 |
| Impact resilience (@60° C., %) | 63 | 63 | 56 | 53 |

(note-3) III: 3-(N,N-dimethylamino)-1-propyllithium containing two isoprene monomer units between "propyl" and "lithium" thereof.
(note-4) I: 1,3,5-tris(3-trimethoxysilylpropyl) isocyanurate.
(note-5) II: N,N-dimethylaminopropylacrylamide.

"Styrene unit content (% by weight)" in Tables 1 and 2 was measured according to a refractive index method defined in JIS K6383, wherein JIS means Japanese Industrial Standards.

"Vinyl group content (%)" therein was measured according to an infrared spectroscopic analysis on a peak of a vinyl group (910 $cm^{-1}$).

"Mooney viscosity (ML1+4 100° C.)" therein was measured at 100° C. according to JIS K-6300.

"Impact resilience (@60° C., %)" therein was measured by a method comprising the steps of:

(1) kneading (i) 100 parts by weight of the modified polymer rubber obtained in each of the above Examples, or 100 parts by weight of the polymer rubber obtained in each of the above Comparative Examples, and (ii) components shown in Table 3 in a laboplastomil to obtain a kneaded product, (2) molding the kneaded product with a 6-inch roll into a sheet, (3) vulcanizing the sheet by heating at 160° C. for 45 minutes to obtain a vulcanized sheet, and (4) measuring a 60° C. impact resilience of the vulcanized sheet with a Luepke resilience tester.

TABLE 3

| Component | Blending ratio (part by weight) |
|---|---|
| Modified polymer rubber, or polymer rubber | 100 |
| Silica (note-6) | 78.4 |
| Silane coupling agent (note-7) | 6.4 |
| Carbon (note-8) | 6.4 |
| Extender oil (note-9) | 47.6 |
| Antioxidant (note-10) | 1.5 |
| Zinc white | 2 |
| Vulcanization accelerator (note-11) | 1 |
| Vulcanization accelerator (note-12) | 1 |
| Wax (note-13) | 1.5 |
| Sulfur | 1.4 |

(note-6): ULTRASIL VN3-G, manufactured by Degussa.
(note-7): Si69 manufactured by Deggusa.
(note-8): N-339 manufactured by Mitsubishi Carbon.
(note-9): Aroma oil, X-140, manufactured by Kyodo Oil Co., Ltd.
(note-10): Antioxidant, ANTIGEN 3C, manufactured by Sumitomo Chemical Co., Ltd.
(note-11): Vulcanization accelerator, SOXINOL CZ, manufactured by Sumitomo Chemical Co., Ltd.
(note-12): Vulcanization accelerator, SOXINOL D, manufactured by Sumitomo Chemical Co., Ltd.
(note-13): SUNNOC N, manufactured by Ouchishinko Chemical Industrial Co., Ltd.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing a modified polymer rubber comprising the steps of:

(1) polymerizing a conjugated diene monomer or a combination thereof with an aromatic vinyl monomer in a hydrocarbon solvent, in the presence of a compound represented by the following formula [3], to form an alkali metal end-carrying active polymer, and (2) reacting the alkali metal end-carrying active polymer with a coupling agent represented by formula [1] and an isocyanurate compound represented by the following formula [2] in a hydrocarbon solvent, wherein the coupling agent is added in an amount of 0.005 to 0.4 mole per one mole of the active polymer:

$E(CH_2)_nT_mJ$ [3]

$R_cMX_d$ [1]

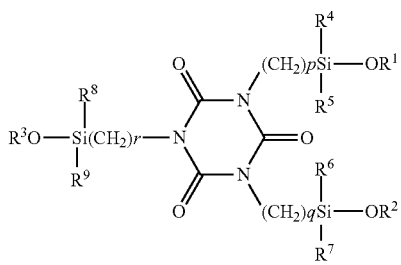 [2]

wherein E in the formula [3] is a group which contains a nitrogen atom having a substituent; T therein is a conjugated diene monomer unit or an aromatic vinyl monomer unit; m therein is an integer of 0 to 10; n is an integer of 1 to 10; J therein is an alkali metal; R in formula [1] is an alkyl group, an alkenyl group, a cycloalkenyl group, or an aromatic hydrocarbon group; M is a silicon atom or a tin atom, X is a halogen atom, c is an integer of 0 to 2, and d is an integer of 2 to 4, each of le to $R^3$ in the formula [2] is independently of one another an alkyl group having 1 to 8 carbon atoms; each of $R^4$ to $R^9$ therein is independently of one another an alkoxy group having 1 to 8 carbon atoms or an alkyl group having 1 to 8 carbon atoms; and each of p, q and r therein is independently of one another an integer of 1 to 8.

2. The process for producing a modified polymer rubber according to claim 1, wherein E in the formula [3] is N,N-dimethylamino group, an N,N-diethylamino group, an N,N-dipropylamino group, an N,N-dibutylamino group, a morpholino group or an imidazolyl group.

3. The process for producing a modified polymer rubber according to claim 1, wherein m in the formula [3] is an integer of 0 to 5.

4. The process for producing a modified polymer rubber according to claim 1, wherein n in the formula [3] is an integer of 3 to 10.

5. The process for producing a modified polymer rubber according to claim 1, wherein T in the formula [3] is an isoprene monomer unit, and m therein is 2.

6. The process for producing a modified polymer rubber according to claim 1, wherein J in the formula [3] is a lithium metal.

7. The process for producing a modified polymer rubber according to claim 1, wherein each of $R^1$ to $R^3$ in the formula [2] is independently of one another a methyl group, an ethyl group, a propyl group or a butyl group; each of $R^4$ to $R^9$ therein is independently of one another a methoxy group, an ethoxy group, a propoxy group or a butoxy group; and each of p, q and r therein is independently of one another an integer of 2 to 5.

8. The process for producing a modified polymer rubber according to claim 1, wherein the isocyanurate compound represented by the following formula [2] is added in the step (2) in an amount of 0.06 to 10 mol per one mol of the alkali metal end-carrying active polymer.

* * * * *